US008341026B1

(12) United States Patent
Mirchandani et al.

(10) Patent No.: US 8,341,026 B1
(45) Date of Patent: Dec. 25, 2012

(54) DATA FEED ADOPTION TRACKING

(75) Inventors: Jeetendra Mirchandani, Bellevue, WA (US); Mohit Gupta, Bellevue, WA (US); Brian J. Schuster, Seattle, WA (US); Simon C. Vining, Renton, WA (US)

(73) Assignee: Amazon Technologies, Inc., Reno, NV (US)

( * ) Notice: Subject to any disclaimer, the term of this patent is extended or adjusted under 35 U.S.C. 154(b) by 279 days.

(21) Appl. No.: 12/627,565

(22) Filed: Nov. 30, 2009

(51) Int. Cl.
G06Q 30/00 (2012.01)

(52) U.S. Cl. ...................................... 705/26.1

(58) Field of Classification Search .................. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| 6,029,141 | A * | 2/2000 | Bezos et al. ................ 705/27.1 |
| 6,076,070 | A * | 6/2000 | Stack ............................. 705/20 |
| 6,976,006 | B1 * | 12/2005 | Verma et al. ............... 705/26.64 |
| 7,640,184 | B1 * | 12/2009 | Lunt ............................. 709/217 |
| 7,752,314 | B2 * | 7/2010 | Trevor et al. ................. 709/226 |
| 7,957,723 | B2 * | 6/2011 | Punaganti Venkata et al. ......................... 455/412.1 |
| 2002/0004735 | A1 * | 1/2002 | Gross ............................. 705/10 |
| 2002/0069116 | A1 * | 6/2002 | Ohashi et al. ................. 705/26 |
| 2002/0111873 | A1 * | 8/2002 | Ehrlich et al. ................. 705/26 |
| 2007/0061711 | A1 * | 3/2007 | Bodin et al. ................. 715/523 |
| 2008/0082941 | A1 * | 4/2008 | Goldberg et al. ............. 715/810 |
| 2008/0086484 | A1 * | 4/2008 | Darnell et al. ................. 707/10 |
| 2008/0250031 | A1 * | 10/2008 | Ting et al. ................... 707/100 |
| 2008/0281832 | A1 * | 11/2008 | Pulver et al. ................. 707/100 |
| 2009/0063294 | A1 * | 3/2009 | Hoekstra et al. .............. 705/26 |
| 2011/0238533 | A1 * | 9/2011 | Shadchnev et al. .......... 705/27.1 |

OTHER PUBLICATIONS

Villano, Matt "Interland Rewards Affiliates for Referrals", CRN n1082 pp. 37, Feb. 9, 2004. Retreived from Dialog File: 15, Acc#: 02689586.*

* cited by examiner

Primary Examiner — Naeem Haq
(74) Attorney, Agent, or Firm — Thomas Horstemeyer, LLP

(57) ABSTRACT

This document relates to tracking the adoption of a data feed. For example, a feed of items is sent to a referral network site. The feed includes some of the items sold through an electronic commerce network site. The referral network site refers a plurality of customers to the electronic commerce network site. The referral includes feed generation information. A determination is made whether the feed has been adopted by the referral network site based upon the feed generation information.

20 Claims, 5 Drawing Sheets

DATA FEED ADOPTION TRACKING

BACKGROUND

For merchants that sell products on the Internet, it can be useful to have other network sites help drive traffic to the network site of the merchant in order to increase sales. Such other network sites may be paid a referral fee or other fee by the merchant for each customer that is directed to the network site of the merchant. Such other network sites may comprise comparison shopping sites that compare the prices of multiple merchants for various items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
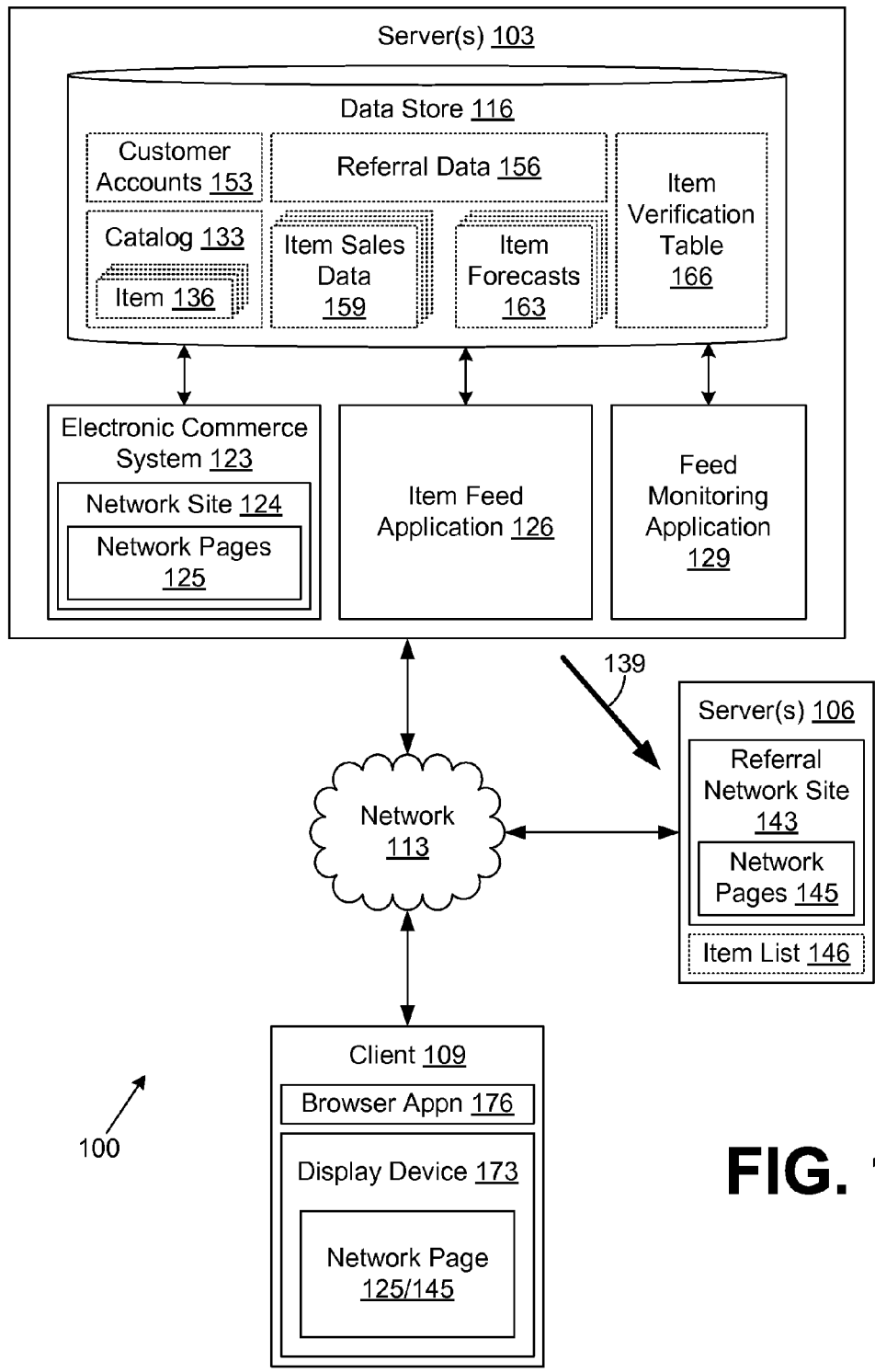
FIG. 1 is a drawing of a networked environment that includes servers and a client according to an embodiment of the present disclosure.

With reference to FIG. 1, the following relates to the transmission of data to a network site 124 such as a comparison shopping site in a networked environment 100 in association with the activities of a merchant that sells goods and/or services online over a network 113 such as the Internet or other network. In the following discussion, first a description of the physical nature of the networked environment 100 is provided, followed by a description of the operation of the same. A more detailed discussion of various aspects is provided with respect to later figures.

The networked environment 100 depicted in FIG. 1 includes various computing devices such as, for example, one or more servers 103, one or more servers 106, one or more clients 109, and/or other computing devices that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, each of the servers 103, 106 and the client 109 are referred to herein in the singular. However, it is understood that in one embodiment, each of the servers 103, 106 may represent a plurality of servers. Also, the client 109 may represent a plurality of clients.

Each of the servers 103 and/or 106 comprises one example of a computing device that may be employed to execute various components as described herein. Each of the servers 103 and/or 106 may comprise, for example, a server computer or like system, and may represent multiple servers arranged, for example, in one or more server banks or other arrangements. Such servers 103 and/or 106 may be located in a single installation or may be dispersed among many different geographical locations. To this end, each of the servers 103 and/or 106 may be viewed as a server "cloud" that represents the computing capacity of multiple servers, etc.

Various applications and/or engines are executed in the server 103 according to various embodiments. Also, various data may be stored in a data store 116 that is accessible to the server 103. The data stored in the data store 116, for example, may be associated with the operation of the various systems, applications, and/or processes described below. The systems and applications executed in the server 103 may include, for example, an electronic commerce system 123, an item feed application 126, a feed monitoring application 129, and potentially other systems and applications. Among other functions, the electronic commerce system 123 includes a network site 124 as will be described. In addition, other systems, applications, and/or processes may be implemented in the server 103 that are not discussed in detail herein.

The electronic commerce system 123 is configured to conduct electronic commerce to facilitate the network presence of one or more online merchants through the network site 124. Thus, the electronic commerce system 123 operates one or more network sites 124 such as web sites on the network 113 that facilitate electronic commerce. The electronic commerce system 123 may comprise many different applications, components, and/or systems implemented on a plurality of computing devices such as the server 103 that are located at one site, or are distributed among geographically diverse sites as can be appreciated.

The applications and/or components that make up the electronic commerce system 123 provide for various functions to facilitate electronic commerce such as maintaining and accessing a catalog 133 in which is stored data describing a plurality of items 136 such as products sold to customers by an online merchant. The data describing each of the items 136 may include item images and other information. The items 136 sold through the electronic commerce system 123 may comprise, for example, goods and/or services.

The electronic commerce system 123 may also facilitate various functions associated with the operation of the network site 124 such as, for example, generating network pages 125 that provide for searching for items 136 and presenting search results for such items 136. Such network pages 125 may also present detailed information about items 136 and may facilitate the purchase of items 136 by providing for payment for items 136 and facilitating other functions. Thus, in providing for the purchase of items 136, the electronic commerce system 123 implements one or more network sites 124 that generate a plurality of different network pages 125 such as web pages or other network content that is served up to various clients 109 controlled by customers. Such network pages 125 may be static and/or created dynamically.

The item feed application 126 is executed in the server 103 in order to generate a feed 139 that comprises a listing of the items 136 that is sent to a referral network site 143 implemented on the server 106. The referral network site 143 functions to refer clients 109 to the network site 124 and other sites as will be described. The referral network site 143 generates and serves up network pages 145 to clients 109 as will be described.

The information included in the feed 139 is stored in association with the operation of the referral network site 143 as item list 146. The feed monitoring application 129 is executed in the server 103 in order to monitor that item list 146 is updated by the referral network site 143 with respect to the items 136 listed in the feed 139 after it is received at the referral network site 143. In some embodiments, the feed monitoring application 129 may be included in the electronic commerce system 123.

In addition, various customer accounts 153 may be maintained in the data store 116. Such customer accounts 153 may include customer data that describes the customer including payment addresses, delivery addresses, payment instruments, and other data used to consummate various commercial transactions. Also associated with each of the customer accounts 153 are browse histories, purchase histories, and potentially other data.

Also stored in the data store 116 are referral data 156, item sales data 159, item forecast data 163, an item verification table 166, and potentially other data. The referral data 156 includes data that tracks when a client 109 has requested a network page 125 from the network site 124 based upon a referral from the referral network site 143 as will be described. The item sales data 159 tracks the number of each of the items 136 that are sold over time through the electronic commerce system 123 as well as other information about the sales of items 136. The item forecast data 163 includes sales forecasts generated for each of the items 136 that are generated based on various factors such as past sales performance and other factors. The item verification table 166 is used to track whether items 136 included in the feed 139 appear on respective network pages 145 generated by the referral network site 143 as expected. The various data stored in the data store 116 may be stored or accessed by the electronic commerce system 123, the item feed application 126, the feed monitoring application 129, or other applications and systems as can be appreciated.

As mentioned above, the server 106 is employed to implement the referral network site 143. In one embodiment, the referral network site 143 provides for comparison shopping and is configured to generate and serve up network pages 145 that include listings of multiple offerings for various items 136 from multiple different merchants as will be described. The item list 146 includes information about each of the items 136 included in the feed 139 sent to the referral network site 143. Such information may include all or a portion of the information contained about such items 136 in the catalog 133.

The client 109 is representative of a plurality of client devices that may be coupled to the network 113. For example, the client 109 may comprise one of millions of clients 109 coupled to the Internet. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 109 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include a display device 173, indicator lights, speakers, etc. The display device 173 may comprise, for example, cathode ray tubes (CRTs), liquid crystal display (LCD) screens, gas plasma-based flat panel displays, LCD projectors, or other types of display devices, etc.

Executed within the client 109 are various applications including a browser application 176. The client browser application 176 is configured to interact with the electronic commerce system 123 and potentially other applications on the server 103 according to an appropriate protocol such as the Internet Protocol Suite comprising Transmission Control Protocol/Internet Protocol (TCP/IP) or other protocols. To this end, the browser application 176 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the browser application 176 may comprise some other type of interface application with like capability. When executed in the client 109, the browser application 176 is configured to render network pages 125/145 such as, for example, web pages and the like on the display device 173 and to perform other functions. Also, the browser application 176 may implement the execution of active portions of the network pages 125/145 as can be appreciated.

Next, a general description of the operation of the various components described above in the networked environment 100 is provided. The electronic commerce system 123 is configured to conduct electronic commerce with various customers through clients 109 over the network 113 as described above. To this end, the electronic commerce system 123 implements a network site 124 through which items 136 are sold to customers as can be appreciated. Such items 136 are stored in the catalog 133 as described above. In conducting electronic commerce with various clients 109, the electronic commerce system 123 may serve up various network pages 125 that serve various purposes as mentioned above.

The sales of items 136 through the electronic commerce system 123 may occur through any one of multiple channels. One such channel involves sales that originate through a referral from a respective referral network site 143. Another channel involves direct sales consummated by the electronic commerce system 123 without a referral. In addition, sales of items 136 may involve other channels. Thus, a channel as contemplated herein refers to a mode in which the sale of an item 136 was originated or consummated.

As mentioned above, in one embodiment, the referral network site 143 implemented on the server 106 refers customers to the network site 124 associated with the electronic commerce system 123 to potentially consummate a purchase of an item 136.

Figure 2:
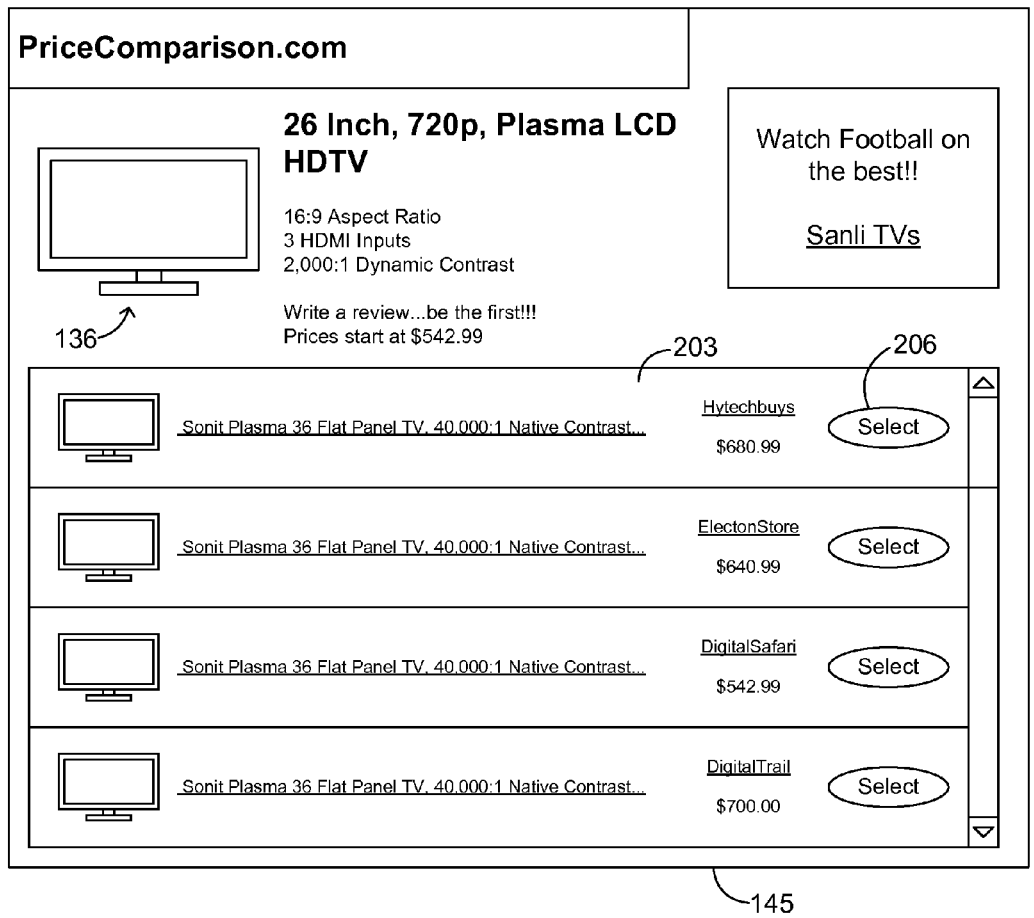
FIG. 2 is a drawing of a network page generated by a network site hosted on one of the servers in the networked environment of FIG. 1 according to an embodiment of the present disclosure.

To explain further, reference is made to FIG. 2, in which one example is shown of a network page 145 generated by the referral network site 143 (FIG. 1). The network page 145 is one example of many different network pages 145 generated by the referral network site 143, where the referral network site 143 provides for price comparison shopping. Examples of such price comparison sites include www.shopzilla.com, www.shopping.com, and other such sites. To this end, the network page 145 displays an item 136 along with a basic description of the item 136. A more detailed description of the item 136 may also be displayed, or links, tabs, or other connections to a more detailed explanation may be included, etc. In addition, the network page 145 displays a number of merchant offerings 203 for the respective item 136. To this end, a user is able to specify a given item 136 that they wish to purchase on the referral network site 143 by performing a product search or by navigating through a taxonomy as can be appreciated. The user may then cause the referral network site 143 to generate the network page 145 that sets forth the merchant offerings 203 for the respective item 136. The user can then compare the various merchant offerings 203 for the item 136 and select the offer they favor the most. Associated with each merchant offering 203 is a link 206 that directs the customer to a respective site of a corresponding merchant. One of the links 206 directs the customer to the network site 124 (FIG. 1) of the merchant that operates the electronic commerce system 123 (FIG. 1) described above. Each of the links 206 may be embodied in the form of a "select" button or other component as can be appreciated. If a user wishes to pursue a purchase of the item 136 based on a respective merchant offering 203, then the user may click on the respective button or other component associated with such merchant offering 203 to be referred to the merchant site.

Referring back to FIG. 1, upon manipulating the link 206, the user is referred to a network page 125 generated by the network site 124 that comprises, for example, a detail page presenting the item 136 with the ability to place such item into a shopping cart and proceed to checkout in order to purchase such item 136 or take other action. In order to cause the network site 124 to generate the respective network page 125 that comprises a detail page presenting the respective item 136 viewed in the network page 145, the link 206 causes a browser application 176 (FIG. 1) to generate a request for the specific network page 125 that comprises the detail page presenting the item 136 as can be appreciated.

Such a request includes information indicating that the request is based upon a referral from the respective referral network site 143. The electronic commerce system 123 is configured to store all of the referrals received from referral network sites 143 for each of the items 136 in the referral data 156 (FIG. 1). Thus, over time, the electronic commerce system 123 will store all of the referrals received from referral network sites 143 in the data store 116 (FIG. 1) for future reference in determining whether items 136 are to be included in the feed 139 (FIG. 1) as will be described.

In some situations, there may be a commercial relationship established between the operator of a referral network site 143 and a merchant who operates the electronic commerce system 123. For example, the merchant operating the electronic commerce system 123 may pay the operator of a referral network site 143 a predefined fee for each referral received. Alternatively, the merchant and the operator of the referral network site 143 may agree that the merchant is to pay the operator a predefined percentage of the sales price for all items 136 sold based upon a referral received from the referral network site 143.

In this respect, the parties may generate mutually beneficial relationships such that the merchant receives the benefit of extra traffic driven to the network site 124, and the operator of the referral network site 143 receives the benefit of having more items 136 to list and more merchant offerings 203 (FIG. 2) to show in various comparisons for various items 136 as described above. In addition, there may be other terms specified between the parties for the referral activity.

A number of referrals may be tracked in both the server 103 by the respective merchant and in the server 106 by the respective operator of the referral network site 143 so that precise amounts owed based upon referrals as described above can be determined. Similarly, the number of sales based upon a referral may be maintained in the server 103 in the item sales data 159 (FIG. 1) so that appropriate amounts may be calculated to pay to the operator of the referral network site 143 as can be appreciated.

In order to provide the operator of the referral network site 143 with the information needed to present the merchant offering 203 with respect to items 136, the item feed application 126 is executed in the server 103 in order to generate the feed 139 that includes a subset of the total number of items 136 stored in the catalog 133. The feed 139 includes a listing of a subset of all of the items 136 contained in the catalog 133 that have been selected or otherwise designated to send to the referral network site 143. The information contained in the feed 139 for each of the items 136 included therein may comprise selected details about such items 136 including item images, product descriptions, product feedback ratings, and other information as can be appreciated.

The feed 139 may be sent from the item feed application 126 to the referral network site 143 periodically in such a manner so as to maintain the most up-to-date item list 146 in the referral network site 143. For example, the feed 139 may be sent weekly, daily, every few hours, or at any other appropriate time interval as can be appreciated. In one embodiment, the feed 139 may include a description of all items 136 included therein in a complete listing. In other embodiments, the feed 139 may only include such information that has changed relative to a prior feed 139 sent previously. For example, such information may include any changed prices, or other aspects of the items 136 that have been sent to the referral network site 143 in a prior feed 139.

The item feed application 126 may also include feed generation information within the feed 139. The feed generation information may be included within a network address associated with each item 136 included in the feed 139. The network address may be a uniform resource locator (URL), a uniform resource identifier (URI), or other appropriate network address protocol including the feed generation information as attributes. The feed generation information can include a feed identifier, a feed generation start time, and/or a feed generation end time (e.g., the feed generation finish time or the time the feed 139 is provided to the referral network site 143). Alternatively, the feed identifier in the network address may be utilized to determine the start and end times of the feed 139 from a database of feed information. In addition, other feed generation information may be included as can be appreciated. In some embodiments, the feed generation start time and the feed generation end time are dates. In other embodiments, the feed generation start and end times can include time information (e.g., hour, minute, etc.) to allow for identification of feeds which are generated multiple times per day. In this way, it is possible to monitor the processing of feeds 139 to the referral network site 143 by providing feedback without impacting the operation of the referral network site 143.

Figure 3:
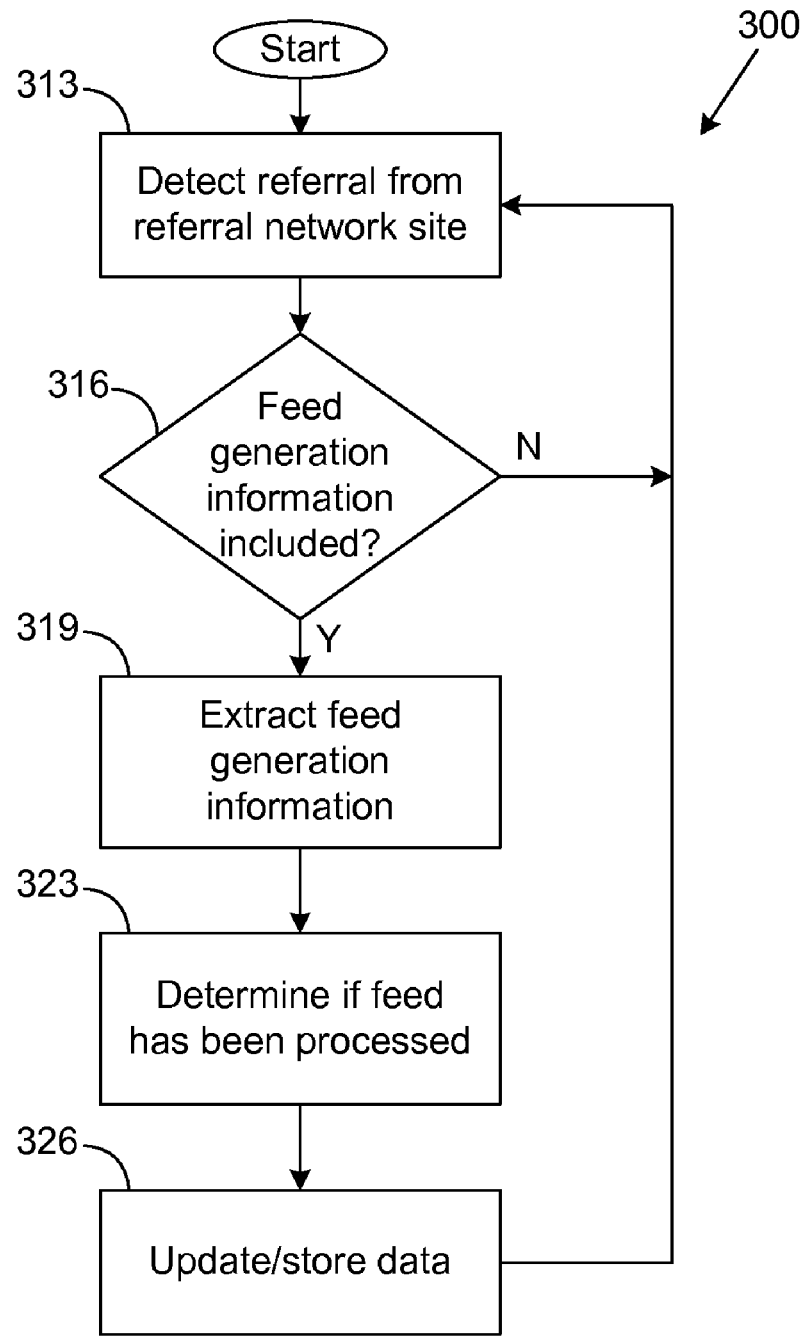
FIG. 3 is a drawing of a flowchart that illustrates example functionality of a monitoring process of a feed monitoring application implemented in one of the servers in the networked environment of FIG. 1 according to an embodiment of the present disclosure.

The feed monitoring application 129 (FIG. 1) is executed to monitor client referrals received from one or more referral network sites 143 in order to monitor whether the referral network site(s) 143 have incorporated the most up-to-date feed 139 into the item list 146. With reference to FIG. 3, shown is a flowchart that illustrates one example of a monitoring process 300 of the feed monitoring application 129 that is executed to determine whether the referral network site 143 has adopted the most up-to-date feed 139 provided to the referral network site 143 as described above. Alternatively, the flowchart of FIG. 3 may be viewed as depicting steps of a method implemented within the electronic commerce system 123 (FIG. 1) according to various embodiments.

To begin, in box 313, the monitoring process 300 detects a referral from a referral network site 143. The feed monitoring application 129 then determines in box 316 if feed generation information is included in the referral. In some embodiments, this determination may be based upon information included in the network address of the referral (e.g., a URL class). Alternatively, this determination may be skipped if all client referrals include feed generation information. If feed generation information is not included in the client referral, then the monitoring process 300 returns to box 313. Otherwise, the feed generation information is extracted from the referral in box 319. Other information such as, but not limited to, referral network site 143 and item 136 identification may also be obtained from the client referral.

The extracted feed generation information is then used, in box 323, to determine if the listing of items 136 included in a feed 139 provided to the referral network site 143 has been incorporated into the item list 146. To that end, a feed information table, including generation information of the feeds 139 provided to the referral network sites 143, may be maintained (e.g., in data store 116) by the feed monitoring application 129. The feed 139 corresponding to the item 136 associated with the referral may be identified by comparing the extracted feed information to feed generation information in the feed information table. If it is determined from the extracted feed generation information that the detected referral is the first referral associated with the provided feed 139 (or for an item 136 included in the provided feed 139), then this may be used as an indication that processing of the feed 139 has been completed by the referral network site 143.

The information may then be used to store or update data in box 326. In one embodiment, a flag may be used in the feed information table to indicate whether a referral for an item 136 associated with the feed 139 has been received. Alternatively, date and time information corresponding to the initial client referral associated with the feed 139 may be stored in the feed information table. In some embodiments, this date and time information may be used as the estimated processing (or update) time of the feed 139. In some embodiments, the processing delay for the feed 139 is capped at a predefined period. For example, the predefined period may be based upon the intervals at which feeds 139 are provided to the referral network site 143. In other embodiments, the processing delay is allowed to continue to accrue until the initial client referral associated with the feed 139 is received. Alternatively, if no initial referral is received, the processing delay may be based upon receipt of a predetermined number of initial referrals associated with subsequent feeds 139.

Any subsequent referrals corresponding to the feed 139 may be utilized to determine additional tracking information. For example, the time of the latest referral corresponding to the feed 139 may be monitored. Alternatively, the number of referrals corresponding to a specific feed 139 that are received by the electronic commerce system 123 may be monitored. The specific items 136 or the number of each item 136 requested by a referral may also be tracked. In one embodiment, the total number of referrals and the number of unique referrals may be tallied. Data such as, but not limited to, receipt time of subsequent referrals, the time difference between receipt of the initial referral and receipt of a subsequent referral, and item information may be stored or updated (e.g., in data store 116) based upon the additional tracking information accordingly.

In other embodiments, referrals received after the initial client referral may be monitored to determine the completeness of the feed processing by the referral network site 143. If a subsequent referral for an item 136 is determined to be associated with an earlier feed 139, even though a more recent feed 139 included the item 136, then this may indicate that only a portion of the more recent feed 139 has been processed by the referral network site 143. Alarms or other indications may be provided if the delay of the subsequent referral exceeds a predetermined threshold. For example, if the subsequent referral is determined to be associated with an earlier feed 139 that was provided more than a defined period (e.g., 72 hours, 5 days, 2 weeks, etc.) before the most recent feed 139, than an alarm is provided indicating incomplete processing of feeds 139 by the referral network site 143. The threshold may be initially established and/or subsequently varied based upon the monitored feed processing time and/or referral traffic of the referral network site 143. In this way, alarms can be adjusted to conform to the operation of the referral network site 143.

The processing information may be analyzed to provide indications and/or alarms for potential feed processing problems. If no referrals are received for a feed 139 within a predefined period after the feed 139 is provided to the referral network site 143, an alarm and/or notification may be provided indicating that the feed has not been processed. In some embodiments, the number of referrals associated with a feed 139 that are received may be utilized to indicate parsing or incomplete processing of feeds 139 by a referral network site 143. For example, the number of referrals associated with the feed 139 within a defined period may be compared to the total number of items 136 provided in the feed. If this ratio falls below a predefined threshold (e.g., an expected level of referral activity), then a notification and/or alarm may be provided.

Figure 4:
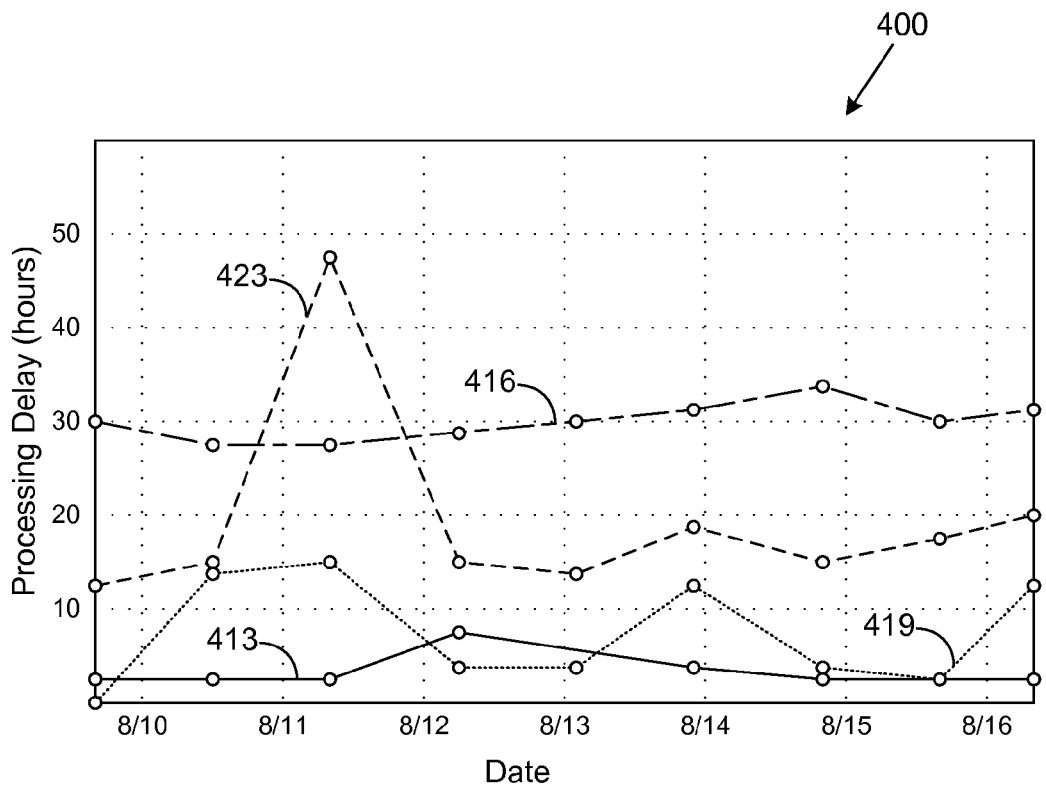
FIG. 4 is a drawing of a graphical illustration of processing latency of feeds that may be determined by the feed monitoring application of FIG. 1 according to an embodiment of the present disclosure.

Graphical representations of the processing information may also be encoded and provided for display by a display device. With reference to FIG. 4, shown is a graphical illustration 400 of processing latency of feeds 139. In the exemplary embodiment of FIG. 4, the processing delays for four referral network sites 143 are depicted. The processing delay for each feed 139 sent to a referral network site 143 during the illustrated time period of FIG. 4 is depicted as a dot (o). The processing delay is based upon the time a feed 139 is sent to a referral network site 143 (e.g., the completion time of the feed send) and the time the initial client referral associated with in the feed 139 is received. As illustrated in FIG. 4, processing delays may vary between referral network sites 143. For example, the average processing delay of a feed 139 for the referral network site 143 depicted by line 413 is approximately 5 hours, while the average processing delay of a feed 139 for the referral network site 143 depicted by line 416 is approximately 30 hours.

The processing latency information may be monitored to provide alarm indications of potential problems with feed processing. In one embodiment, the processing delay for each feed 139 may be compared to a predetermined threshold. The predetermined threshold may be a fixed value or may be predetermined by a moving average of a number (N) of previous feed processing delays. Alternatively, a moving average of a number of feeds may be compared to a predetermined threshold. For example, if the threshold is set for a value of 10 hours, the processing delay of four of the feeds for the referral network site 143 depicted by line 419 would produce an alarm condition when compared individually, prompting operator notification. However, a moving average of four feeds would not produce an alarm condition. This could indicate a reoccurring problem that should be addressed by the referral network site 143. Alternatively, based upon the cyclical nature of the feed delays, the referral network site 143 may have a processing cycle that is dependent upon other operating conditions. In contrast, the spike in the processing delay for the referral network site 143 depicted by line 423 would likely produce alarms for both the individual feed analysis and the moving average analysis.

The processing latency of feeds may also be generated for rendering as a graphical display for user examination. The processing delay for each referral network site 143 may be a different color and/or pattern that are identifiable through a key or directory. Other information may also be accessible through the graphical display such as, but not limited to, the name of the referral network site 143, the name or other identification of the feed 139, and/or the feed processing time. The graphical display may also allow for filtering to display information for one or more referral network sites 143 and the range of dates to be displayed.

Individual feed information such as, but not limited to, name of the referral network site 143, feed name, feed identification, date/time of last referral associated with the feed 139, processing time of the feed 139, the number of referrals associated with the feed 139 that have been received, the number of items 136 in the feed 139, and the number of unique referrals associated with the feed 139 that have been received may also be provided for rendering and display in a table. The displayed information may be filtered to allow displaying one or more feeds 139 or information over a date range.

Figure 5:
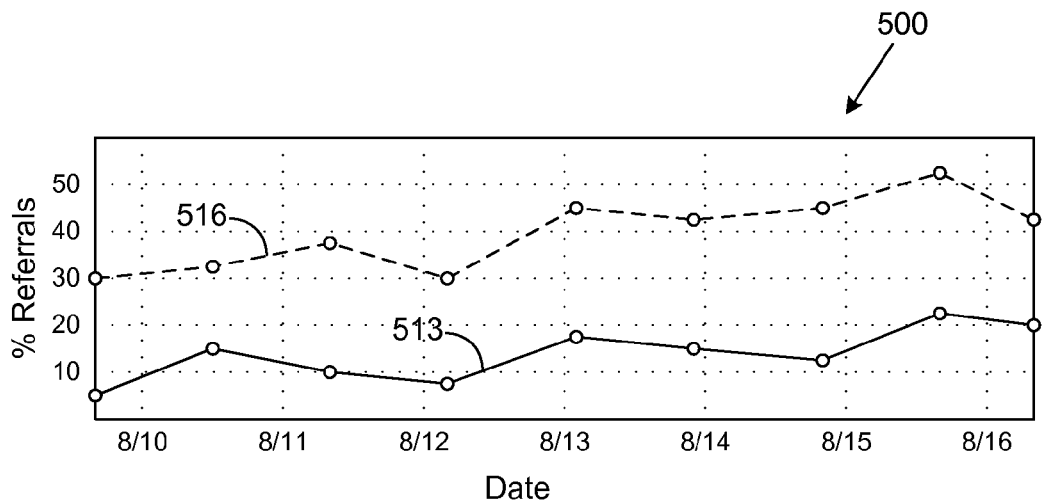
FIG. 5 is a drawing of a graphical illustration of referral coverage by age that may be determined by the feed monitoring application of FIG. 1 according to an embodiment of the present disclosure.

With reference to FIG. 5, shown is a graphical illustration 500 of referral coverage by age. The exemplary embodiment of FIG. 5 illustrates the percentage of referrals associated with one or more feeds 139 that were received within predetermined time limits of providing the feed 139 to a referral network site 143 (FIG. 1). For example, line 513 represents the number of referrals associated with the most up-to date feed 139 that were received within the last 24 hours and line 516 represents the number of referrals associated with the most up-to date feed 139 that were received within the last 48 hours. In the embodiment of FIG. 5, the performance of all the feeds provided within the period of 8/10 to 8/16 has been aggregated. As such, the percentage of referrals for all feeds 139 sent to the referral network sites 143 on a given day during the illustrated time period of FIG. 4 are depicted as dots (o). This provides an indication of how quickly the referral network sites 143 are adopting the feeds 139. The displayed information may be filtered to allow displaying one or more feeds or information over a selected range of dates.

Alarm indications may be provided by comparing the referral coverage to a predetermined threshold. The predetermined threshold may be a fixed value or may be predetermined by a moving average of the referral coverage within a defined range of a referral coverage data point. For example, a moving average may be determined from the four previous referral coverage values and used for comparison with the current referral coverage value. In this way, a large enough deviation from the current trend will cause a notification to be generated.

Figure 6:
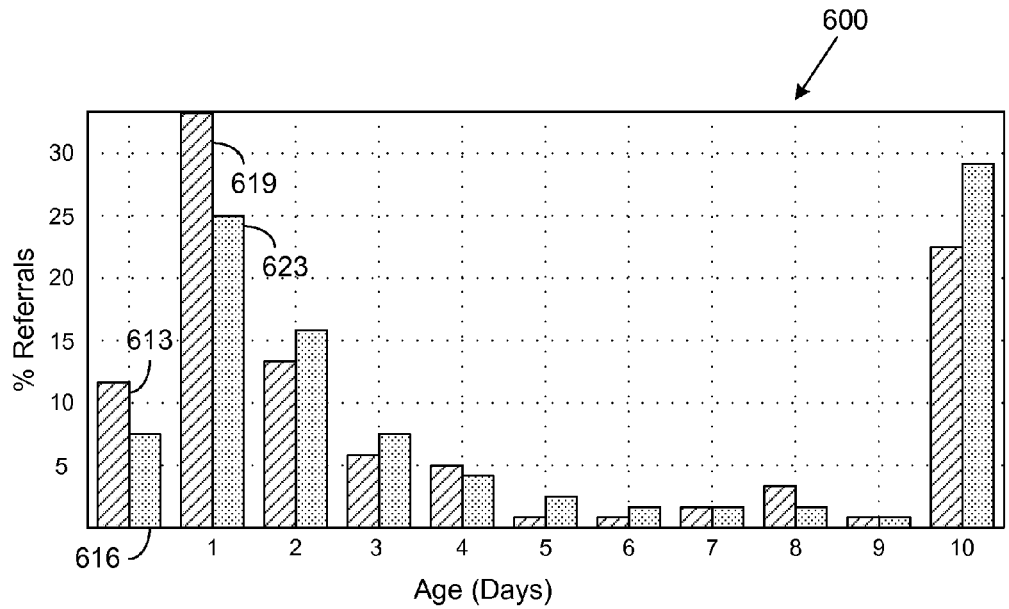
FIG. 6 is a drawing of a graphical illustration of an age histogram of referral coverage that may be determined by the feed monitoring application of FIG. 1 according to an embodiment of the present disclosure.

Next, with reference to FIG. 6, shown is a graphical illustration 600 of an age histogram of referral coverage. The exemplary embodiment of FIG. 6 illustrates the comparison of the age of the referrals for all feeds 139 on a given day to the average age of referrals for all feeds 139 over a defined period. For example, bar 613 is the percentage of referrals that have been received within 24 hours of sending their associated feed 139. Bar 616 is the average percentage of referrals over a predetermined period (e.g., over the last 14 days). Similarly, bar 619 is the percentage of referrals that have been received within 24-48 hours (or an age of one day) and bar 623 is the average percentage of referrals over the predetermined period. Indications are provided for ages up to nine days with the tenth day including any referrals that are equal to or greater than 10 days old. The displayed information may be filtered to allow displaying one or more feeds or information over a selected range of dates.

Comparison of the daily value to the average value may be used to indicate a problem with adoption of the provided feeds 139. If the daily value (e.g., bars 613, 619, etc.) fall below the average value (e.g., bars 616, 623, etc.), then a problem may exist with the adoption of the provided feeds. For example, an alarm condition may be indicated when the daily value falls below a predetermined percentage of the average value. Alternatively, an indication that the daily values are greater than the average values, as illustrated in FIG. 6 (e.g., bar 613>bar 616 and bar 619>bar 623), may indicate improvement of the adoption of the provided feeds by the referral network sites 143.

Figure 7:
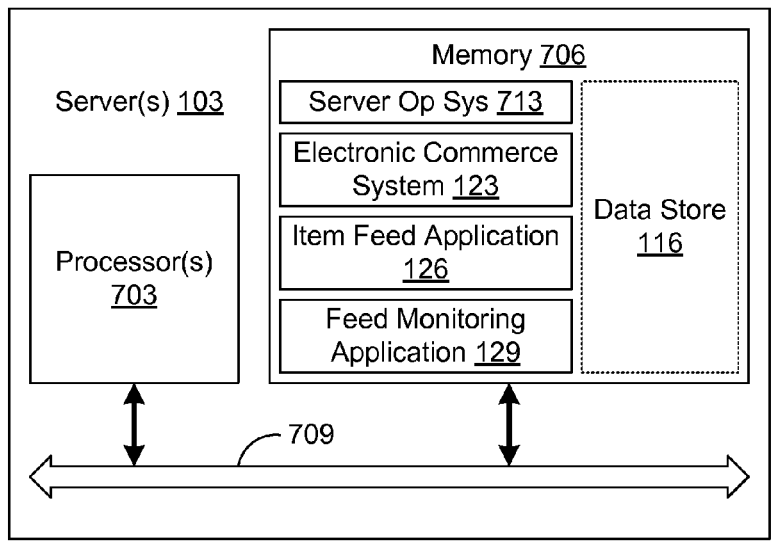
FIG. 7 is a schematic block diagram of one example of one of the servers in the networked environment of FIG. 1 according to an embodiment of the present disclosure.

Referring next to FIG. 7, shown is a schematic block diagram of one example of a server 103 according to an embodiment of the present disclosure. The server 103 includes at least one processor circuit, for example, having a processor 703 and a memory 706, both of which are coupled to a local interface 709. The processor 703 is a solid state device that includes millions of switching elements such as transistors and other elements. The server 103 may comprise, for example, a server computer system or like device as described above. The local interface 709 may comprise, for example, a data bus with an accompanying address/control bus or other bus structure as can be appreciated.

Stored in the memory 706 are both executable applications and/or systems executed by the processor 703 and data. In particular, stored in the memory 706 and executable by the processor 703 are a server operating system 713, the electronic commerce system 123, the item feed application 126, the feed monitoring application 129, and potentially other applications and/or systems, etc. Also, stored in the memory 706 is the data store 116 in which are stored the various data items 136 described above so as to be accessible to the processor 703. It is understood that other data may be stored in the memory 706 and accessed by the processors 703 beyond the data described above.

A number of software components are stored in the memory 706 and are executable or executed by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 703 may represent multiple processors and the memory 706 may represent multiple memories that operate in parallel. In such a case, the local interface 709 may be an appropriate network 113 that facilitates communication between any two of the multiple processors 703, between any processor 703 and any one of the memories 706, or between any two of the memories 706, etc. The local interface 709 may comprise additional systems designed to coordinate this communication, including, for example, performing load balancing. The processor 703 may be of electrical or of some other available construction.

The various systems, applications, or other components described above may be implemented using any one or more of a number of programming languages such as, for example, C, C++, C#, Visual Basic, VBScript, Java, JavaScript, Perl, Ruby, Python, Flash, or other programming languages.

Although the various applications and other components such as, for example, the electronic commerce system 123, the item feed application 126, and the feed monitoring application 129 described above may be embodied in software or code executed by general purpose hardware, as an alternative each may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of the various applications and/or other components such as, for example, the feed monitoring application 129 as described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications, systems, and/or other components described herein such as, for example, the electronic commerce system 123, the item feed application 126, and the feed monitoring application 129 comprise software or code, each can be embodied in any computer-readable medium for use by or in connection with an instruction execution system such as, for example, a processor 703 in a computer system or other system. In this sense, the applications or engines may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, semiconductor, or other media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer readable medium embodying a program executable by at least one computing device, comprising:
    an item feed application configured to periodically send a feed of a subset of a plurality of items to a comparison shopping network site over a network, the item feed including a universal resource locator (URL) associated with each of the subset of items, the URL including feed generation information corresponding to the feed, the items being sold to a plurality of customers through an electronic commerce network site over a network; and a feed monitoring application comprising:
  code that detects a referral for an item from the comparison shopping network site;
  code that extracts the feed generation information from the URL associated with the item of the referral;
  code that identifies which feed is associated with the referral based upon the extracted feed generation information;
  code that determines whether the referral is an initial referral associated with the identified feed; and
  code that determines a processing delay time for the feed in response to the referral being the initial referral associated with the identified feed.

2. The non-transitory computer readable medium embodying the program executable by the at least one computing device of claim 1, wherein the feed monitoring application further comprises code that stores the processing delay time for the feed in a database.

3. The non-transitory computer readable medium embodying the program executable by the at least one computing device of claim 1, wherein the feed monitoring application further comprises code that extracts information about the item from the referral.

4. The non-transitory computer readable medium embodying the program executable by the at least one computing device of claim 1, wherein the feed monitoring application further comprises code that determines whether the referral includes feed generation information.

5. The non-transitory computer readable medium embodying the program executable by the at least one computing device of claim 1, wherein the feed generation information includes a unique feed identifier.

6. A method, comprising the steps of:
  sending, by a computing device, a feed of a subset of a plurality of items sold through an electronic commerce network site implemented in the computing device to a referral network site, the referral network site referring a plurality of customers to the electronic commerce network site, the feed including a plurality of network addresses each corresponding to one of the subset of items;
  receiving, by the computing device, a referral from the referral network site, the referral comprising a network address corresponding to one of the plurality of items;
  determining, by the computing device, whether the referral is a first referral associated with the feed based upon feed generation information included in the network address; and
  determining a feed processing delay time for the feed in response to the referral being the first referral associated with the feed.

7. The method of claim 6, further comprising storing, by the computing device, the processing delay time in a database.

8. The method of claim 7, further comprising determining, by the computing device, a processing latency of a plurality of feeds sent to the referral network site based upon corresponding processing delay times stored in the database.

9. The method of claim 8, further comprising encoding, by the computing device, a graphical representation of the processing latency for display on a display device.

10. The method of claim 6, further comprising determining, by the computing device, whether the network address includes feed generation information before determining whether the referral is associated with the feed.

11. The method of claim 6, further comprising providing, by the computing device, an alarm indication when the feed processing time exceeds a predetermined threshold.

12. The method of claim 11, wherein the predetermined threshold is an average of feed processing times of the previous N feeds sent to the referral network site.

13. A system, comprising:
  at least one computing device;
  an electronic commerce system implemented in the at least one computing device and configured to sell a plurality of items over a network;
  an item feed application implemented in the at least one computing device and configured to send a feed of a subset of the items to a referral network site over a network, the item feed including feed generation information in a plurality of network addresses, each network address corresponding to one of the subset of items; and
  a feed monitoring application implemented in the at least one computing device, the feed monitoring application being configured to:
    detect a referral from the referral network site, the referral comprising a network address corresponding to an item;
    determine whether the referral is an initial referral associated with the item feed based upon feed generation information included in the network address; and
    determine a processing delay time for the item feed in response to the referral being the initial referral associated with the item feed.

14. The system of claim 13, wherein the feed monitoring application is further configured to store the processing delay time in a database.

15. The system of claim 14, wherein the feed monitoring application is further configured to determine a processing latency for a plurality of feeds sent to the referral network site.

16. The system of claim 13, wherein the feed monitoring application is further configured to provide a notification when an initial referral associated with the item feed is not received within a predefined period after sending the item feed to the referral network site.

17. The system of claim 13, wherein the feed monitoring application is further configured to determine whether the network address includes feed generation information before determining whether the referral is associated with the feed.

18. The system of claim 13, wherein the feed monitoring application is further configured to determine a time difference between receipt of the initial referral and receipt of a subsequent referral associated with the item feed.

19. The system of claim 18, wherein the feed monitoring application is further configured to determine a percentage of all referrals associated with the item feed that are received within a predetermined time of the initial referral.

20. The system of claim 13, wherein the network address is a universal resource locator (URL).

* * * * *